Jan. 23, 1923. 1,443,073
C. F. GILCHRIST.
DYNAMO ELECTRIC MACHINE.
FILED JUNE 25, 1917.
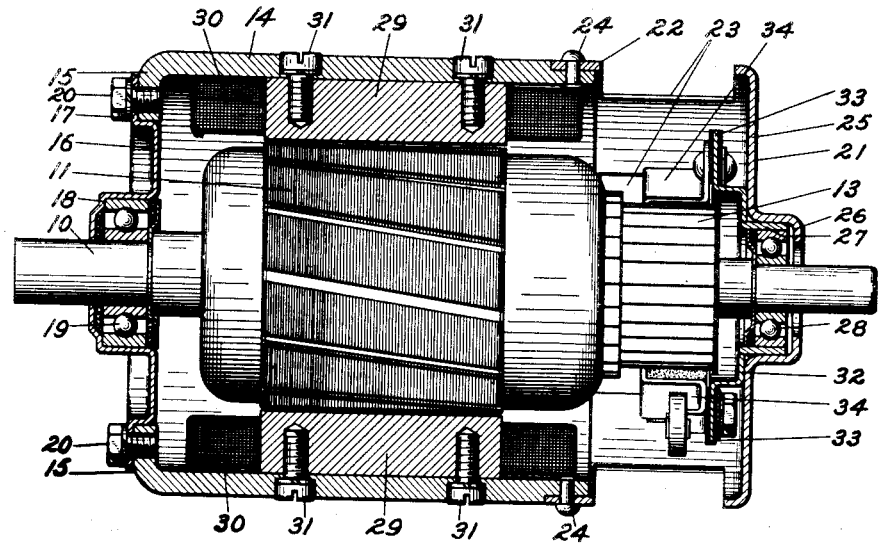
Fig. I.
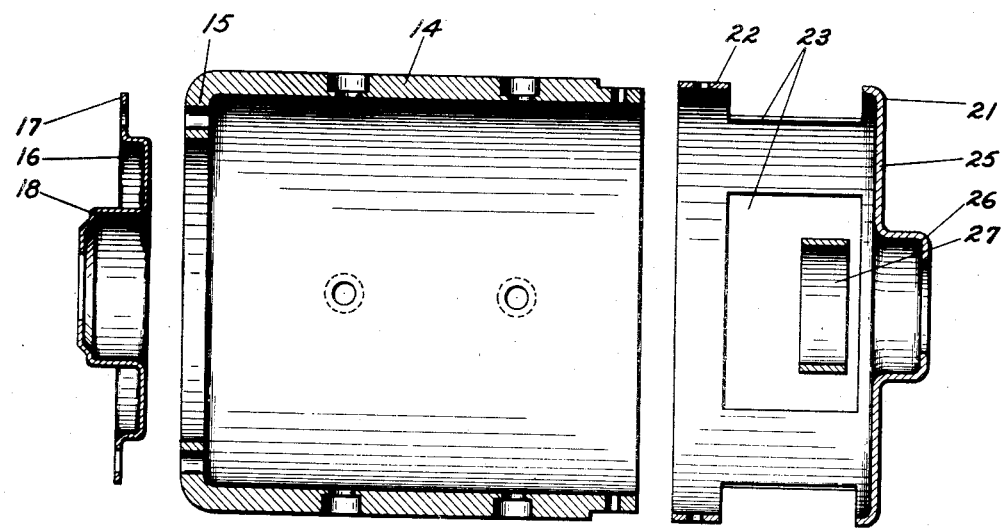
Fig. II.
Inventor
Clarence F. Gilchrist
By Chester H. Braselton
Attorney Patented Jan. 23, 1923.

1,443,073

UNITED STATES PATENT OFFICE.

CLARENCE F. GILCHRIST, OF TOLEDO, OHIO.

DYNAMO-ELECTRIC MACHINE.

Application filed June 25, 1917. Serial No. 176,752.

*To all whom it may concern:*

Be it known that I, CLARENCE F. GILCHRIST, a citizen of the United States, residing at Toledo, in the county of Lucas and State of Ohio, have invented certain new and useful Improvements in Dynamo-Electric Machines, of which I declare the following to be a full, clear, and exact description.

This invention relates to improvements in dynamo-electric machines and is applicable to either generators or motors and especially to small-size machines, such as are used in connection with the starting and lighting system of a motor vehicle.

In the manufacture of starting and lighting systems for automobiles, of what is known as the two-unit type, both motors and generators are employed, which are of substantially the same size and are usually rather small so that they do not take up a great deal of space. In the manufacture of such systems on a large scale it is highly desirable to reduce the number of different parts which are used in the construction of such systems, to a minimum so as to facilitate the production of these devices.

The principal object of this invention is to provide an improved dynamo-electric machine construction of such a nature as to permit of the manufacture of the different parts of said machines in units, which may be afterwards assembled to form the complete motor or generator, and also to provide a construction such that one or more of the units may be utilized in either a motor or generator. A further object of my invention is to provide an improved casing construction for a dynamo-electric machine, and to provide improved means for the assembly of the units with reference to said casing.

Further objects, and objects relating to economies of manufacture and details of construction, will definitely appear from the detailed description to follow.

I accomplish the objects of my invention in one embodiment thereof by the devices and means described in the following specifications.

A structure constituting a preferred embodiment of my invention is illustrated in the accompanying drawings, forming a part of this specification, in which:

Fig. I is a longitudinal sectional view taken through a machine embodying my invention, and Fig. II is a longitudinal, sectional view through the casing for said machine, the parts of said casing being slightly separated from each other to show the manner in which they are to be connected.

In the drawings, similar reference numerals refer to similar parts throughout the several views.

Considering the numbered parts of the drawings, it will be seen that my machine comprises an armature unit made up of the shaft 10 on which is mounted the armature 11, and the commutator 13. One end of the frame or casing 14 has an internal flange 15 and is closed by an end plate 16, having a peripheral flange 17, which engages the inturned flange 15 of the casing and is secured thereto by means of the bolts 20. The end plate 16 is provided with a central cup 18, struck out therefrom, which forms a housing for the bearing 19 for the shaft 10. A commutator and brush housing 21 is located at the other end of the casing 14 and comprises a cylindrical portion 22 and an end wall 25. One end of the cylindrical portion fits in an annular recess formed on the exterior of the casing 14 and the two members are secured together by means of rivets 24. The cylindrical portion is also provided with opening 23. The end wall 25 has a central cup portion 26 which may be struck out from the body portion, as illustrated by the drawing.

A ring 27 is disposed in the cup 26, being secured thereto with the edge of said ring projecting beyond the plane of the end wall 25, to form a support for the commutator brush unit. The bearing 28 for the armature shaft 10 is disposed in said cup 26 within the ring 27.

The field pole unit comprises cores 29, which are secured in place by the screws 31 passing through the wall of the generator casing 14. The cores 29 carry the usual field windings 30. The commutator brush unit comprises the ring 32, which is secured in proper position to the end wall 25 of the commutator housing by means not shown and has a central opening therein, which fits over the inner end of the ring 27 and is centered thereby. This commutator brush holder ring 32 is provided with a flange 33 to which the brush holders 34 are secured, the entire brush unit being rotatable on the ring 27 to permit adjustment of the brushes.

Each of these units which I have described may be manufactured separately and assembled to form a complete motor or generator, as the case may be. The armature units may differ slightly for motor and generator and the same is true of the field pole units and of the commutator brush units, but the casing unit will be the same for either a motor or generator, so that all that is necessary is to assemble and mount the proper units in place within the casing, according as one wishes to produce a motor or a generator. This results in considerable saving, as it is only necessary to provide a single casing structure, which is used for either the motor or the generator, so that the number of different parts which must be made is lessened.

Further, the motor or generator is so constructed that a motor may be changed into a generator, or vice versa, by removing the armature, field pole and commutator brush units and substituting for those employed in a motor, the units necessary for a generator, without disturbing the casing structure. I have further provided an improved casing structure, which permits of rapid assembly, and which also permits of ready access to the parts of the dynamo-electric machine. This structure completely houses the machine and the bearings are also housed within the cups at the ends of the casing, the machine being completely enclosed except for the ventilating openings, which are provided adjacent the commutator. It will further be noticed that the end plate 16 and the commutator housing 21 are stamped out of sheet metal, thus affording a considerable reduction in the weight of the casing and a considerable saving in the cost of manufacture.

I am aware that the particular embodiment of my invention which I have here shown and described, may be varied considerably without departing from the spirit of my invention, but I have found that this particular embodiment is desirable from many standpoints, and, therefore, I desire to claim my invention specifically as well as broadly, as indicated by the appended claims.

Having thus described my invention, what I claim as new and desire to secure by Letters Patent is—

1. In a dynamo-electric machine, the combination of an armature having a shaft; a commutator; a casing having a commutator housing secured thereto and provided with an integral end wall having a cup struck out axially thereof; a ring fitting in said cup; a bearing for said shaft disposed in said cup within said ring; and a commutator brush holder ring having an inwardly turned flange with an opening in engagement with the edge of said ring.

2. In a device of the class described, the combination of a casing, an armature and shaft mounted to rotate therein, an end head forming a commutator and brush chamber attached to said casing, said end head having a central projecting member, a ring mounted in said projecting member and having a portion projecting into said chamber and a brush supporting member centered by said projecting portion and adapted to be secured to said end head.

In testimony whereof I affix my signature.

CLARENCE F. GILCHRIST.